Jan. 16, 1968   R. P. METZ   3,364,394
POWER FACTOR CORRECTION APPARATUS
Filed Feb. 15, 1967   2 Sheets-Sheet 1
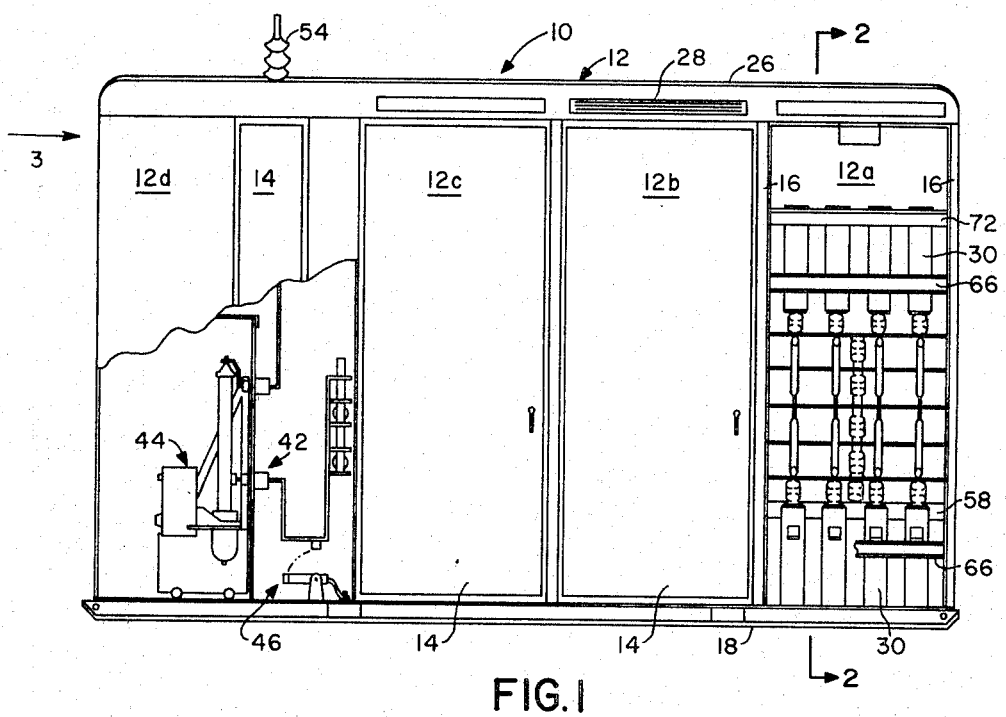
FIG.1
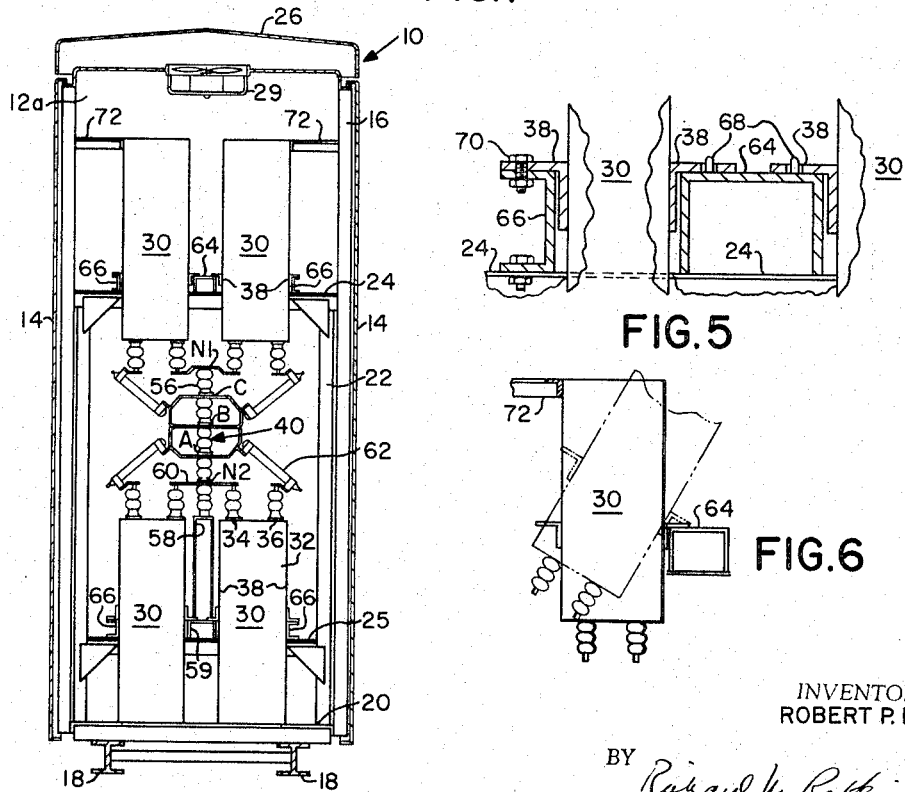
FIG.2
FIG.5
FIG.6
INVENTOR.
ROBERT P. METZ
BY
ATTORNEY Jan. 16, 1968  R. P. METZ  3,364,394
POWER FACTOR CORRECTION APPARATUS
Filed Feb. 15, 1967  2 Sheets-Sheet 2

INVENTOR.
ROBERT P. METZ

BY

ATTORNEY

# United States Patent Office 3,364,394
Patented Jan. 16, 1968

3,364,394
POWER FACTOR CORRECTION APPARATUS
Robert P. Metz, Fort Lee, N.J., assignor to Federal Pacific Electric Company, a corporation of Delaware
Filed Feb. 15, 1967, Ser. No. 616,253
5 Claims. (Cl. 317—99)

ABSTRACT OF THE DISCLOSURE

A compact arrangement of individually-cased capacitors and a central bus assembly for obtaining a high density power factor correction apparatus within a common housing. The capacitors are each securely held in position but may be individually removed for inspection and replacement. The capacitors are arrayed about a central bus with individual capacitors positioned on opposite sides of vertical and horizontal planes which pass through the central bus assembly.

---

This invention relates to power factor correction apparatus and more particularly to a capacitor and bus arrangement in a capacitor house which is transportable as a complete unit.

With increasing utilization of electric power has come a demand for maximum utilization of the transmission line facilities. In order to obtain maximum utilization power factor correction capacitors have been widely used heretofore. In many instances the capacitors are mounted on racks which are suspended from transmission poles. This is unsatisfactory both from an aesthetic viewpoint and from an engineering viewpoint. Additionally, the exposed capacitors were subject to the vagaries of weather and were found to be attractive targets for vandals. Where power factor correction was needed on underground distribution lines the pole mounted apparatus was, of course, unsatisfactory. Mounting of the capacitors underground would, of course, be the most desirable solution to the engineering and aesthetic problems. However, such mountings are subject to various difficulties such as heat dissipation, possible flooding of the unit by ground water and, most importantly, the expense involved in constructing an underground vault for receiving the capacitor apparatus. As a solution to this problem surface mounting or ground level mounting of capacitor banks has been suggested in the past. However, the prior art solutions have been unsatisfactory due to the rather low density, that is kilovar per cubic feet, achieved in the prior constructions. Further safety and security requirements resulted in greatly increased costs. Also, considerable difficulties and expense were involved in the field erection and assembly of power factor correction apparatus.

It is an object of this invention to provide an aesthetically pleasing, highly compact, power factor correction apparatus having a relatively high Kvar per cubic foot density.

It is still another object of this invention to provide power factor correction apparatus, of high capacity, which is transportable as a completely assembled unit.

It is a further object of this invention to provide power factor correction apparatus embodying novel mounting means for the individual capacitors therein wherein the individual units may be removed for measurement and/or replacement without requiring the other capacitor units to be disturbed.

It is a still further object of this invention to provide means for selectively removing individual ones of a plurality of suspended power factor correction capacitors without disturbing the mounting and/or support of other capacitors within an enclosure.

Briefly, in one embodiment of the invention there is provided power factor correction apparatus which includes a housing having a plurality of serially aligned compartments. A bus assembly is positioned within the housing and extends through at least some of the compartments. One of the compartments is utilized for housing the switchgear associated with power factor correction apparatus. Means are provided for supporting the bus assembly within the compartments with the longitudinal axis of the bus assembly extending lengthwise of the apparatus. The bus assembly is substantially centered within the compartments through which it extends. A plurality of power factor capacitors, each of which is individually cased with a terminal connection at one end, are mounted in the housing. The capacitors are disposed in spaced relation in a plurality of planes which are transverse the longitudinal axis of the housing with a plurality of the capacitors being arranged in pairs above and below the bus assembly with terminal connections of the pairs being disposed in opposition to one another. The capacitors in each pair are disposed on opposite sides of the bus assembly. Means are provided for connecting the capacitor terminals to the bus assembly.

The above and other objects and advantages of the invention will become apparent to those skilled in the art from the following discussion taken in conjunction with the accompanying drawings in which:

FIG. 1 is a front elevation of the power factor correction apparatus according to one embodiment of this invention in which some parts are shown broken away and other parts have been omitted in the interest of simplicity and clarity;

FIG. 2 is an elevation view taken from the plane 2—2 of FIG. 1 showing the individual capacitors mounted within the capacitor housing;

FIG. 5 is a fragmentary view, on a greatly enlarged scale, illustrating details of the capacitor mounting means; and FIG. 6 is a diagrammatic representation of the mode of removal of a capacitor.

Figure 3:
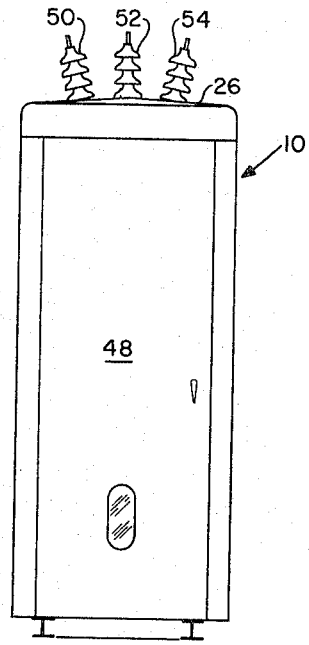
FIG. 3 is an end view, taken in the direction of the arrow 3 of FIG. 1.

In the illustrated embodiment of the invention the power factor correction apparatus 10 includes a housing 12 subdivided into a plurality of compartments 12a, 12b, 12c and 12d. Each of the compartments has an access door 14 on each side of the housing, equipped with appropriate interlock devices (not shown), for allowing access to the contained apparatus for maintenance and inspection when de-energized. The housing 12 is a panel-type structure and is internally supported by various structural members including substantially full height vertical channels 16 at the corners of each compartment. The support structure includes a longitudinal I-beam base 18 and a floor 20 of subway grating. Supplementary vertical channels 22 and transverse horizontal braces 24, 25 are also at the corners of the compartments and are tied to the vertical channels 16. The compartment doors 14 are hinged from one vertical channel 16 and abut the channel 16 at the other corner of the compartment when closed. The roof 26 of the housing has louvres 28 through which air for cooling, drawn through the subway grating floor 20 by fans 29 in each compartment, exits from the housing 12.

In the illustrated embodiment the capacitors 30 are individually cased including a generally rectangular casing 32 and two terminals 34 and 36 for electrical connection to the capacitor windings therein. The capacitors are of well-known construction, being filled with a dielectric fluid, and further details of their construction are not believed to be necessary for the understanding of the present invention. A pair of opposed L-shaped brackets 38 are fixed to the narrow faces of the casing 32 of each capacitor.

The bus bar system 40 extends the length of the housing through the compartments 12a to 12c for connecting the capacitors to the circuit controlling equipment 42 in compartment 12d. The circuit controlling equipment may include, by way of example, an oil circuit breaker 44 and a grounding switch 46. Included in such equipment, but not shown here, are circuit monitoring devices, various relays, meters and current transformers and the like. The circuit breaker 44 is accessible through an end door 48 which is appropriately hinged to the vertical channels 16 of compartment 12d. Feed-through bushings 50, 52 and 54, mounting on the housing roof 26, connect the transmission line, not shown, to the circuit breaker 44 and then through the interconnecting bus linkage to the bus assembly 40.

Figure 4:
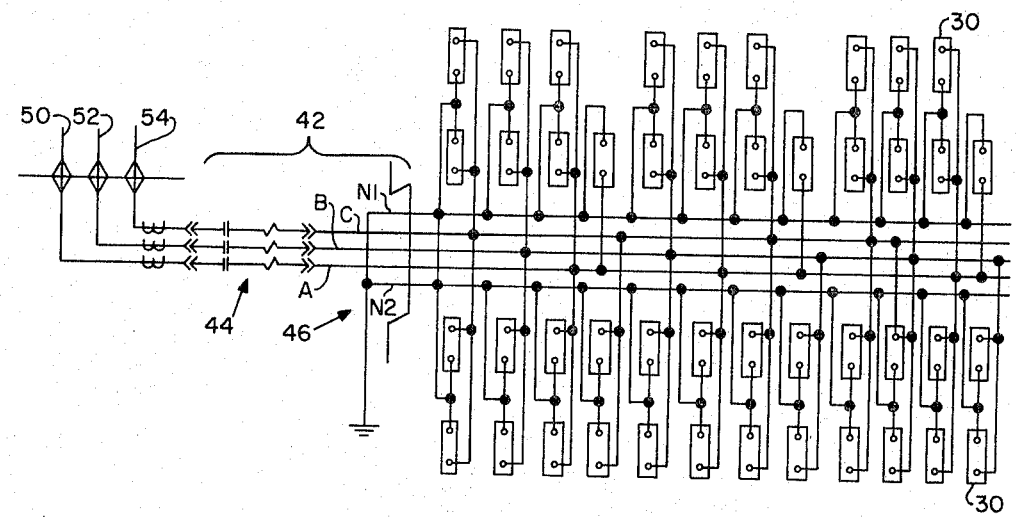
FIG. 4 is a diagrammatic representation of the connection made between the individual capacitors, the bus assembly and the switching means of FIG. 1.

The bus assembly 40 includes a vertically stacked array of bus bars in the following sequence: N1, C, B, A, N2. The bus bars have their broad faces in aligned horizontal planes. The neutral bus bars N1, N2 are connected at grounding switch location in compartment 12d. The bus bars are secured together but separated from one another by insulators 56 and the assembly is secured to and supported by an inverted channel 58 at multiple points along the assembly. Channel 58 extends parallel to, and is secured to, another channel 59. One terminal of each of the capacitors is connected to a neutral bus bar by appropriate straplike connectors 60. The other terminal is connected through a fuse 62 to either one or the other of the A, B, or C bus bars. The interconnection of the capacitors is shown diagrammatically in FIG. 4 with the individual fuse connections omitted in the interest of clarity. It will be understood by those skilled in the art that the blowing of a particular fuse 62 will isolate the capacitor connected thereto from its respective bus bar.

Within a given plane transverse the longitudinal axis of the housing 12, as for example the plane viewed at 2—2 in FIG. 1 and shown in greater detail in FIG. 2, the capacitors are arranged in groups of four about the longitudinally extending bus bar assembly 40. The individual capacitors are arranged, one to a quadrant, about the longitudinal axis of the bus bar assembly. In FIG. 2 the lowermost capacitors are disposed on opposite sides of the bus assembly 40 with their terminals directed upwardly. For ease in understanding the capacitors will hereinafter be referred to as the upper pair (terminals down) and the lower pair (terminals up).

The capacitors are maintained in position by the cooperation of the mounting brackets 38 cooperating with channels 59, 64 and rail members 66. Referring to FIGS. 2 and 5 the upper capacitors are positioned by their adjacent brackets 38 which cooperate with pins 68 fixed at appropriate intervals along the support 64. The pins 68 and brackets 38 form a separable hinge. The brackets 38 disposed on the remote side of the capacitor casings cooperate with a rail 66 that is removably secured to the horizontal brace 24. The capacitors 30 are each connected ot the adjacent rail 66 by a threaded connector 70 thus securely mounting the capacitors in the unit 10. An abutment 72 is provided in each compartment and extends the full length of each compartment. It is adapted to engage the capacitor casings at a point remote from the terminals 34, 36, when rail 66 is removed, and to support the capacitors in position. The capacitors may be removed for inspection and test with great ease as follows: When the bus assembly 40 is de-energized the bus connections to the capacitor terminals are removed and, by removal of the rail 66 the capacitors are free to be tilted about the separable hinge connection with longitudinal support 64. Once tilted, the capacitor may be lifted to disengage the bracket 38 from the pin 68. Reinsertion of the capacitor is achieved by reversing the foregoing steps.

The lower capacitors are mounted in a similar manner; the support 59 being provided with pins to form a similar locating device. In this instance, since the capacitors 30 are resting on the grating 20, no abutment is needed.

The unique mounting structure and bus assembly described above allow relatively high kilovar per cubic foot densities to be achieved. The illustrated apparatus 10 is approximately 196″ long by 120″ high by 52″ wide. The capacitors are each 100 kilovar 15 kv., single phase, 60 cycle, and weigh 115 pounds. The entire apparatus 10 is rated at 4500 kilovar. The rugged structure which securely, yet removably mounts the individual capacitors, provides a power factor correction apparatus which is easily transportable as a unit.

While only one embodiment of the invention has been shown and described it will be evident to those skilled in the art that various changes and modifications may be made without departing from the spirit and scope of the invention.

What is claimed is:

1. Power factor correction apparatus including a housing having a plurality of serially aligned compartments therein, a bus assembly within said housing and extending through at least some of said aligned compartments, means supporting said bus assembly within said compartments with the longitudinal axis of said bus assembly extending lengthwise of said apparatus, said bus assembly being substantially centered within the compartments through which it extends, a plurality of power factor capacitors in said compartments, each of said capacitors having a casing and having a terminal connection at one end thereof, means mounting said capacitors in said housing, said capacitors being disposed in spaced relation in a plurality of planes transverse the longitudinal axes of said housing and said bus assembly with said capacitors within a plane being arranged in pairs above and below a horizontal plane through the bus assembly with the terminal connections of said pairs being disposed in opposition to one another, the capacitors in each pair being disposed on opposite sides of a vertical plane through said bus assembly, and means connecting said capacitor terminal connections to said bus assembly.

2. Power factor correction apparatus according to claim 1 wherein switching means are provided in a like compartment joined to said other compartments for selectively connecting said bus assembly to a source of power or to ground.

3. Power factor correction apparatus according to claim 1 wherein said upper pairs of capacitors are mounted with their terminal connections depending, said mounting means including a pair of rails for engaging and supporting said upper capacitors, said rails extending parallel to the longitudinal axis of said bus assembly and said compartments, a support structure at each end of each of said compartments, one of said rails being fixed to said support structures and the other rail being removably secured to said support structures, an abutment formed in said compartments for engaging the uppermost end of each of the capacitor casing at the side thereof opposite said fixed rail whereby said removably secured rail may be removed while the capacitors normally supported thereby are retained in position by said abutment and said fixed rail and whereby selected ones of said capacitors may be removed by being tilted away from said abutment and lifted from said fixed rail.

4. Power factor correction apparatus according to claim 3 wherein said fixed rail and said removable rail are provided with means for engaging said capacitor casing to thereby removably retain said capacitor in position within said compartment.

5. Power factor correction apparatus according to claim 4 wherein said means for engagement between said fixed rail and said capacitor casing are formed to provide a detachable hinge element.

References Cited

UNITED STATES PATENTS 2,619,521  11/1952  Cutino _____ 317—100 X

ROBERT K. SCHAEFER, *Primary Examiner.*

M. GINSBURG, *Assistant Examiner.*